United States Patent [19]

Lutterschmidt

[11] 4,020,917
[45] May 3, 1977

[54] POSITIVE HYDRAULIC DIRECT DRIVE FOR VEHICLES

[76] Inventor: Sigmund P. Lutterschmidt, R.D. No. 1, Kutztown, Pa. 19530

[22] Filed: Nov. 7, 1975

[21] Appl. No.: 629,965

[52] U.S. Cl. .............................. 180/66 R; 418/148; 418/261

[51] Int. Cl.$^2$ .................... B60K 17/10; F01C 1/00; F03C 3/00; F04C 1/00

[58] Field of Search ......... 180/66 R; 418/260, 261, 418/262, 263, 264, 265, 129, 148, 147, 146, 145

[56] References Cited
UNITED STATES PATENTS

| | | | |
|---|---|---|---|
| 900,410 | 10/1908 | Minor | 418/129 |
| 1,100,004 | 6/1914 | Williams | 180/66 R |
| 1,320,892 | 11/1919 | Munn | 418/264 |
| 1,366,138 | 1/1921 | Traudt | 418/146 |
| 2,379,938 | 7/1945 | Swanson | 418/146 |
| 2,655,785 | 10/1953 | Vlachos et al. | 180/66 R X |
| 2,671,403 | 3/1954 | Peters et al. | 180/66 R X |
| 2,791,284 | 5/1957 | Jackson | 180/66 R X |
| 3,008,531 | 11/1961 | Howard | 180/66 R |
| 3,185,241 | 5/1965 | Jackson | 180/66 R X |
| 3,280,934 | 10/1966 | De Biasi | 180/66 F |
| 3,680,652 | 8/1972 | Greene | 180/66 R X |
| 3,702,642 | 11/1972 | Greene | 180/66 R X |

Primary Examiner—Joseph F. Peters, Jr.
Assistant Examiner—Milton L. Smith
Attorney, Agent, or Firm—Watson, Cole, Grindle & Watson

[57] ABSTRACT

A vehicle has a primary drive pump in communication with driven pumps associated with each wheel for driving the vehicle as hydraulic fluid is ported to the wheel pumps through a by-pass valve. The pumps are similarly designed with each including a rotor co-axially mounted within a fixed stator defining an annular pump chamber when fluid entering an intake opening moves against gradually extending vanes provided on the rotor. The fluid exits through a discharge opening in the stator, and the vanes are designed to be fully retracted at a position between the openings and gradually extended so as to fully extend after moving beyond the intake opening. Also, the vanes gradually retract as they approach the discharge opening. Such a vane movement is effected by means of eccentric grooves provided on opposing side walls of the stator with which portions of the vanes cooperate, thereby avoiding the need for the vane tips constantly contacting a cam surface and being urged in such position by means of springs as in the prior art.

A supply duct interconnects the inlet openings of the driven pumps with the discharge opening of the drive pump, and a return duct interconnects the discharge openings of the driven pumps with the intake opening of the drive pump. The by-pass valve interconnects the supply and return ducts for controlling the acceleration of the vehicle, and a reversing valve device likewise interconnects these ducts for reversing fluid flow therein to effect a reverse rotary motion of the driven pump rotors. Moreover, plungers connected to a service brake pedal are disposed within the ducts for sliding movement into and out of the flow path thereof for preventing fluid flow so as to halt rotary motion of the driven pump rotors thereby effecting a braking operation.

7 Claims, 12 Drawing Figures

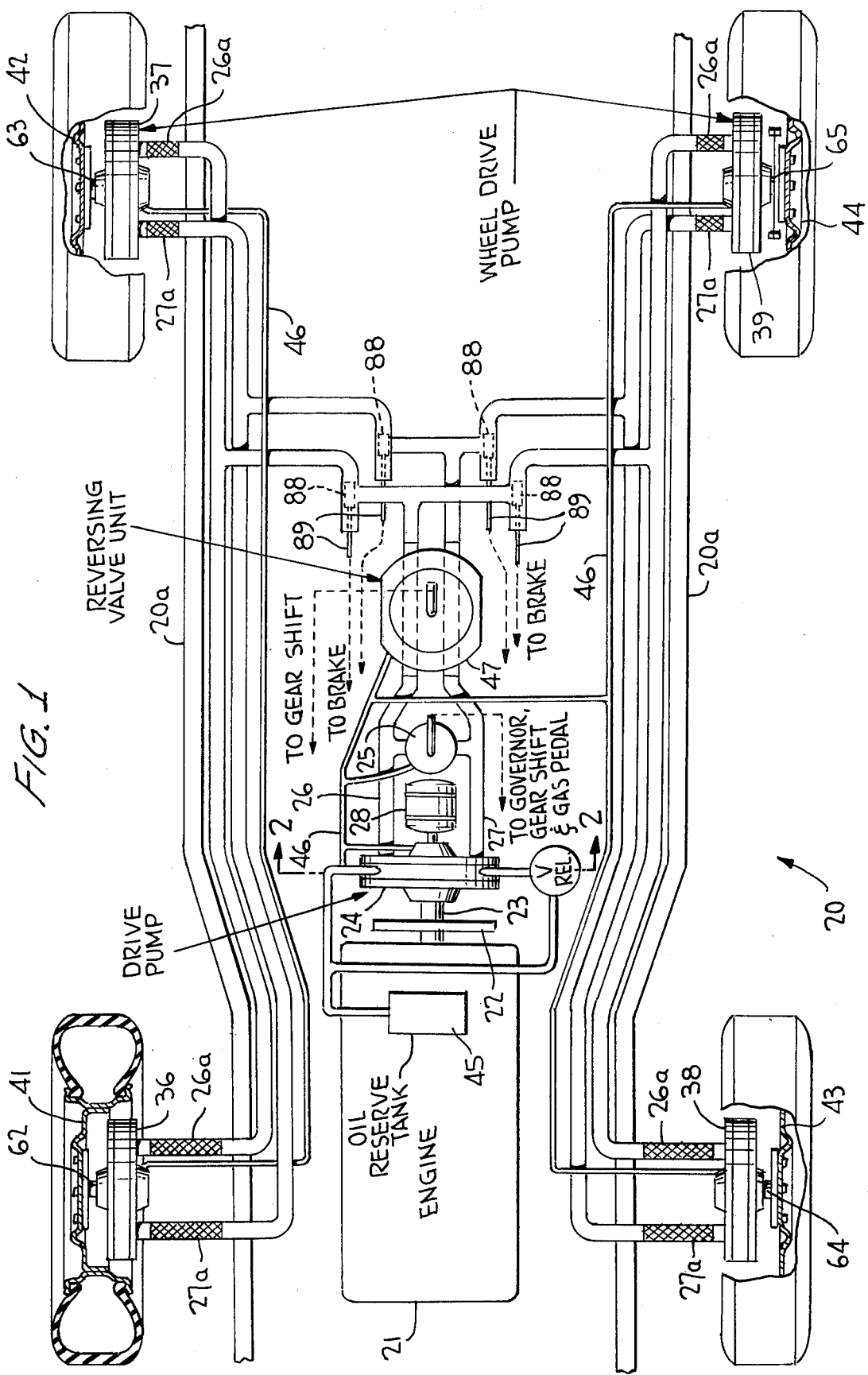

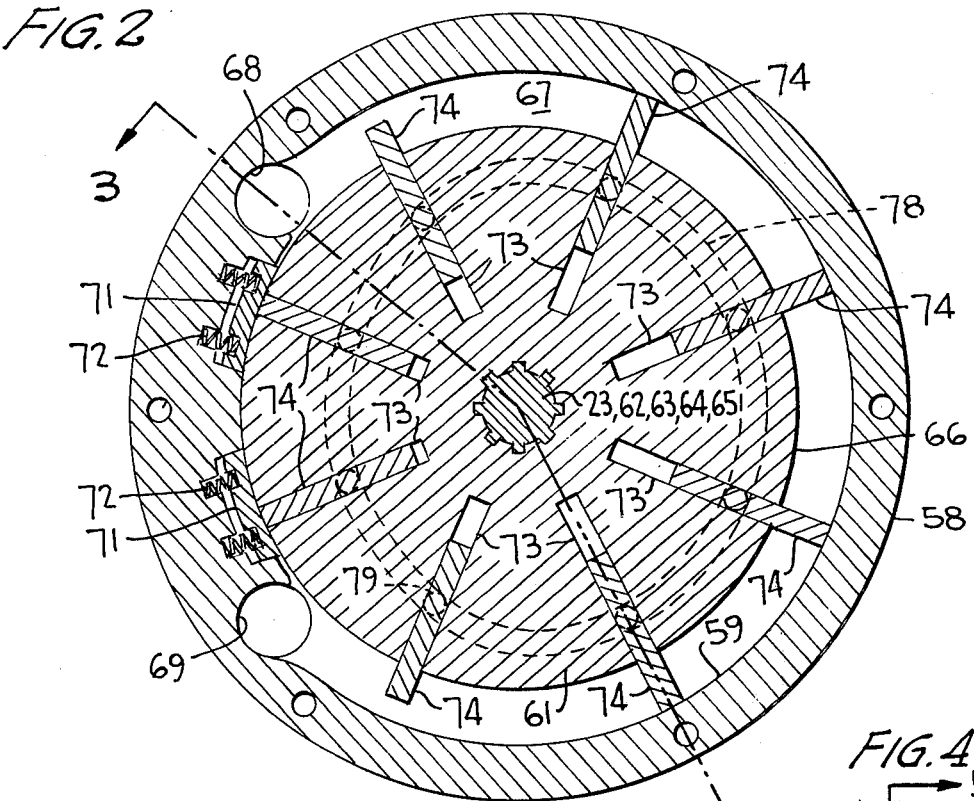
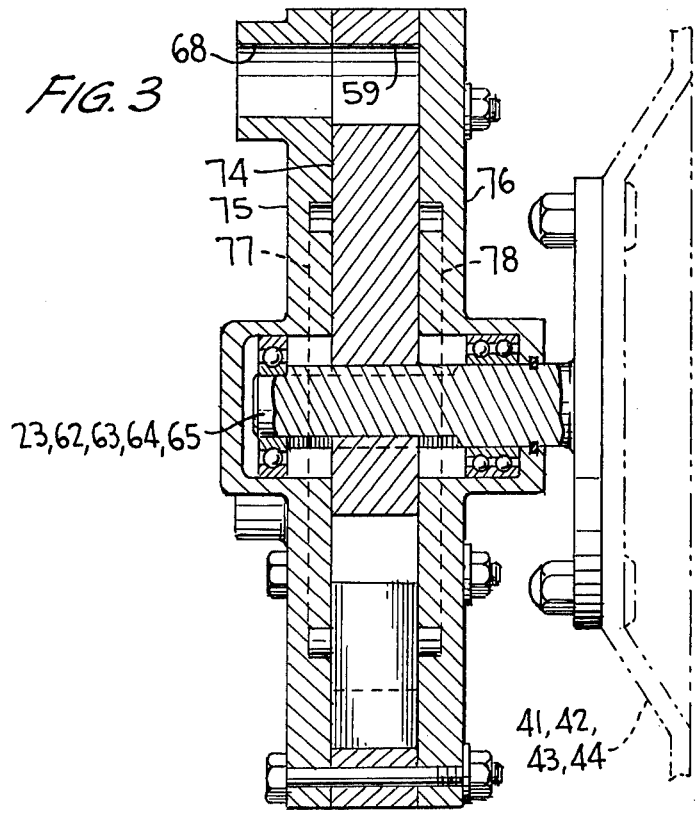
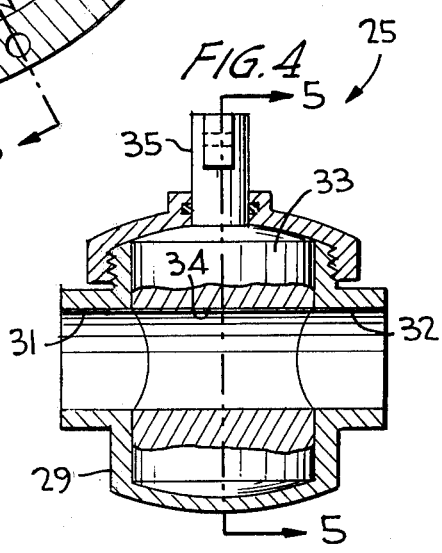
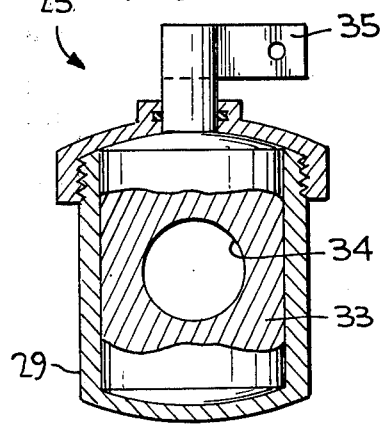

POSITIVE HYDRAULIC DIRECT DRIVE FOR VEHICLES

BACKGROUND OF THE INVENTION

This invention relates generally to a hydraulic drive for vehicles, and more particulary to such a drive which is effected by rotary vanes pumps used as a primary drive pump and as driven pumps associated with each of the vehicle wheels.

Rotary vanes pumps of various designs have in the past been designed as fluid motors for powering vehicles. Slidable radially extending vanes are normally provided on the rotor, and the vane tips are constantly urged by springs into contact engagement with a cam surface of the stator. Such fluid drives are typically shown in U.S. Pat. Nos. 3,702,642; 3,680,652; 3,280,934; 3,185,241; 2,791,284 and 2,655,785.

A typical drawback exists for each of these prior art rotary vanes pumps or motors, e.g., a specific cam surface must be machined for the stator which is costly and often times imperfect, and wearing of both the blade tips and the cam surface occurs as the vanes constantly bear against the surface under the action of springs provided in the vane slots. Undue wear of the parts result and the springs quickly deteriorate as they are constantly expanding and contracting during rotor movement. Moreover, the relative complexities of the prior art designs render them undesirable for use as both a primary drive pump for the hydraulic system and as driven pumps or motors associated with each of the wheels.

SUMMARY AND OBJECTS OF THE INVENTION

It is therefore an object of this invention to provide a hydraulic drive for a vehicle with the use of a rotary vanes pump of simple and economical construction yet highly reliable and easy to manufacture.

A further object is just to provide such a pump in which no cam surface is provided on the stator against which the vane tips bear and are urged into engagement by springs, thereby avoiding undue wear of the parts and no reliance whatsoever on the use of springs for the vanes.

A further object of this invention is to provide such a rotary vanes pump which is reliable for use as both a primary pump for the hydraulic system as well as for the driven pumps or motors associated with each of the wheels of the vehicle.

In carrying out these objectives, the rotary vanes pump has its rotor co-axially mounted within the stator in a manner to define an annular chamber therebetween. Inlet and discharge openings communicating with this chamber are sealingly isolated from one another by a blow-by prevention means located therebetween. Eccentric grooves are located in opposing side walls of the stator for engagement by side portions of the vanes so as to effect a full vane retraction at the blow-by prevention means after which the vanes are caused to gradually extend to full extension as they move beyond the intake opening. Thereafter, the vanes are caused to gradually retract as they approach the discharge opening whereupon a pumping action within the expanding and contracting portions of the chamber takes place during rotary movement. A supply duct interconnects the intake openings of the motors with the discharge opening of the drive pump, and a return duct interconnects the discharge openings of the motors with the intake opening of the drive pump. A by-pass valve interconnects the ducts for controlling vehicle acceleration, and a reversing valve unit interconnects the ducts for effecting reverse fluid flow therethrough when reverse vehicle movement is desired. Also, braking plugs may be disposed in the ducts and operated by a service brake pedal for moving into the path of fluid flow so as to restrain the motors and effect braking.

Other objects, advantages and novel features of the invention will become apparent from the following detailed description of the invention when taken in conjunction with the accompanying drawings.

BRIEF DESCRIPTION OF THE DRAWINGS

FIG. 1 is a hydraulic diagram showing those elements of the hydraulic vehicle drive in accordance with the present invention;

FIG. 2 is a sectional view of the primary drive pump taken substantially along line 2—2 of FIG. 1 and typically showing the rotary vanes pump of the invention used not only as a drive pump but as driven pumps or motors associated with each of the vehicle wheels.

FIG. 3 is a sectional view taken substantially along line 3—3 of FIG. 2;

FIG. 4 is a side elevational view of a by-pass valve used in the FIG. 1 arrangement;

FIG. 5 is a sectional view taken substantially along line 5—5 of FIG. 4;

DESCRIPTION OF THE PREFERRED EMBODIMENT

Figure 6:
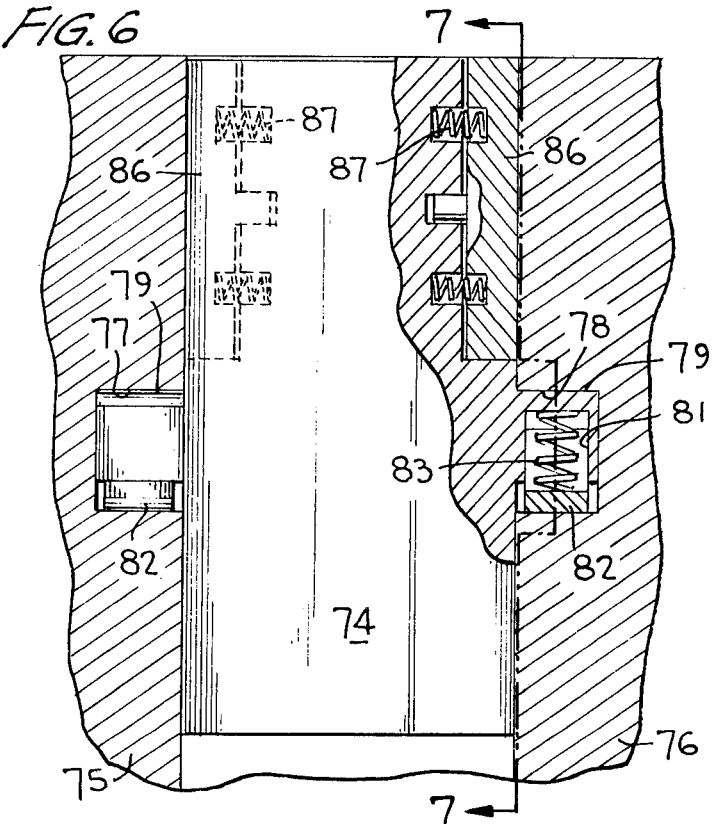
FIG. 6 is an enlarged plan view partly in section of a typical vane mounted in place.

Turning now to the drawings wherein like reference characters refer to like and corresponding parts throughout the several views, a hydraulic diagram is shown in FIG. 1 for vehicle 20 wherein only those parts necessary for fully disclosing the invention are illustrated. The vehicle has an engine 21 with a fly wheel 22 coupled to input shaft 23 of a positive direct drive pump 24 specifically designed in accordance with the present invention and to be more fully described hereinafter. Hydraulic fluid is pumped into a by-pass valve 25 which interconnects supply and return ducts 26 and 27 connected to pump 24. This by-pass valve is in turn connected to and controlled by a conventional centrifugal and throttle linkage control governor 28. The by-pass valve is likewise connected to the gear shift of a standard transmission (not shown) provided for this vehicle as well as being connected to the vehicle gas pedal, likewise not shown for clarity. As shown in FIGS. 4 and 5, this by-pass is of the rotary type including a stationary outer housing 29 connected to the supply and return ducts by means of its respective inlet and outlet ports 31 and 32. A valve block 33 has a diagonal opening 34 extending therethrough and is mounted for rotation within housing 29. This valve block is connected to the governor and the gas pedal by means of element 35 for rotation of the valve block opening into alignment with ports 31 and 32 and out of alignment either totally or partially therewith. Supply and return ducts 26 and 27 communicate with driven pumps 36, 37, 38 and 39 respectively associated with vehicle wheels 41, 42, 43, and 44. These driven pumps are identical in construction and operation to primary drive pump 24 which will be subsequently described in detail, these driven pumps therefore acting as motors driven by the primary pump. Accordingly, the by-pass valve controls the amount and pressure of the hydraulic fluid being shunted to the vehicle wheels as valve block 33 is rotated. At full power, valve block 33 will be rotated so as to dispose its opening 34 completely out of alignment with ports 31 and 32 so as to be in a closed position except while in a starting or in a passing gear operation of the engine. When starting, the by-pass valve acts as a pressure relief valve, allowing some of the fluid to be returned to primary pump 24 through return duct 27, thus allowing smooth starts. When the by-pass valve is in a closed position, the system is placed in direct drive with no slippage whatsoever at this point. Speed at which the by-pass valve fully closes would determine when the present system goes into a direct drive situation as, for example, 20 miles per hour at light throttle pressure. Therefore, through the throttle linkage portion of the governor, this would serve as a kick down passing gear.

Figure 8:
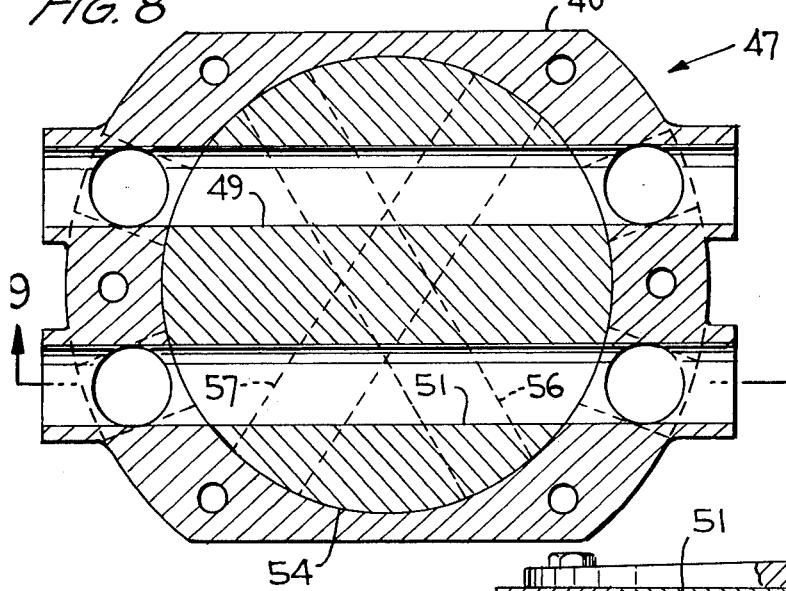
FIG. 8 is a sectional view of the reversing valve unit of the invention and taken substantially along line 8—8 of FIG. 9.
Figure 9:
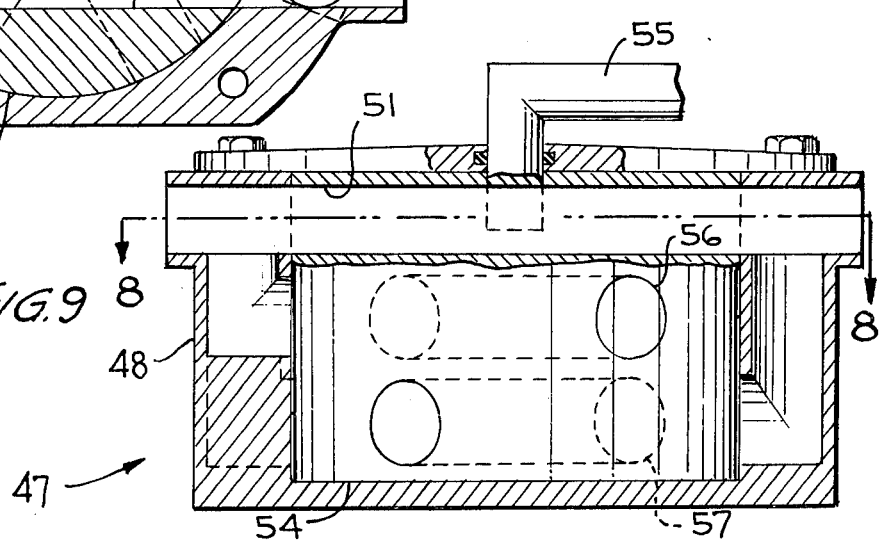
FIG. 9 is a sectional view of the FIG. 8 unit taken as substantially along the line 9—9 thereof.
Figure 10:
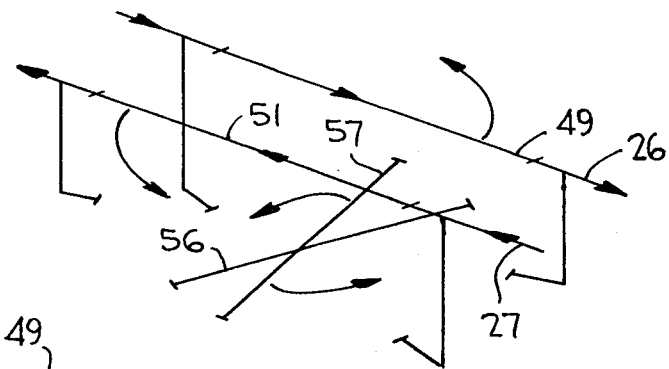
FIG. 10 and 11 are schematic diagrams respectively illustrating a closed position of the reversing valve and an open position thereof.
Figure 11:
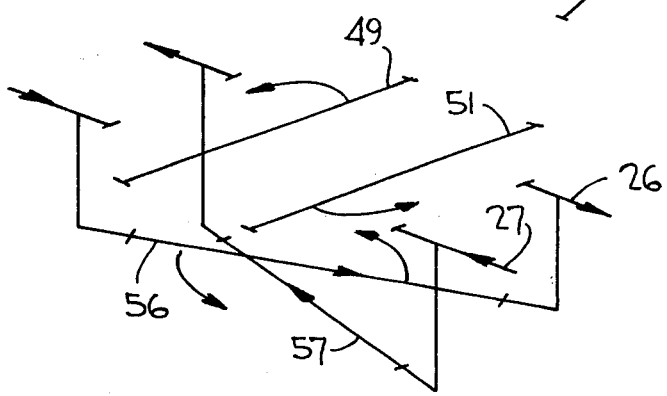

A static oil reserve tank 45 is likewise provided for the primary pump, and its static oil lines 46 interconnect each of the driven pumps as well as the by-pass valve and a reversing valve unit 47 provided for the present system. This reversing valve unit is shown in detail in FIGS. 8 and 9 as including a stationary outer housing 48 as clearly shown in FIG. 1. A cylindrical valve block 54 having aligned passageways 49, 51 which may be aligned respectively with the supply and return ducts 26 and 27 is mounted for rotation within housing 48, and an element 55 mounted on the valve block is connected to the gear shift lever (not shown) to effect rotation of this valve block. Also, intersecting openings 56 and 57 are disposed at different elevations within the valve block for cross-switching the supply and return ducts of the system. Accordingly, when passageways 49 and 51 of the valve block are respectively in axial alignment with the supply and return ducts, no change in the system occurs as illustrated in FIG. 10 so that the motors may be driven to effect forward vehicle movement. However, upon rotation of valve block 54 so as to place cross-openings 56 and 57 in a position of FIG. 11 when these cross-openings respectively interconnect return and supply ducts on opposite sides of the reversing valve, a reversal of fluid flow in the system is effected so as to cause reverse rotation of driven pumps 36 to 39 for reverse vehicle movement. This reversing valve is under the direct control of the operator of the vehicle who may simply activate the shift lever on the steering column to effect rotation of valve block 54.

As seen in FIG. 1, driven pumps 36 and 37 on one side of the vehicle have a common supply line and a common return line, and driven pumps 38 and 39 on the opposite side of the vehicle likewise have a common supply line and a common return line. The size of primary pump 24 determines a gear ratio equivalency as, for example, if the primary pump is the same size as each of the wheel pumps on a four wheel drive system, a 4-to-1 ratio is effected.

Referring to FIGS. 2 and 3, the primary drive pump and each of the driven pumps at the wheels are similar in construction and operation so that only one of such pumps will be described in detail. Each pump comprises a fixed stator 58 having a cylindrical inner surface 59. A cylindrical rotor 61 is co-axially mounted within the stator on its input shaft 23 for the primary pump, and on output shafts 62, 63, 64 and 65 for the respective driven pumps. Outer cylindrical surface 66 of the rotor is spaced inwardly of inner surface 59 so as to define an annular chamber 67 between the rotor and the stator. Intake and discharge openings 68 and 69 are provided in the stator on one side thereof and communicate with chamber 67. For the primary pump, return duct 27 is connected to intake opening 68 and supply duct 26 is connected to discharge opening 69. With the driven pumps, on the other hand, supply ducts 26a are respectively connected to intake openings 68 of these pumps, and return ducts 27a are respectively connected to discharge openings 69 thereof.

Blow-by prevention means are provided on the stator between the intake and discharge openings and, as seen in FIG. 2, such means comprises shoe members 71 having convex outer surfaces of the same contour as outer surface 66 of the rotor so as to smoothly bear thereagainst. These shoe members are urged toward the rotor by means of springs 72.

The rotor is provided with a plurality of radially extending slots 73 therein disposed at 45° angles and each intersecting with outer surface 66 of the rotor. Vanes 74 are disposed in the slots for sliding movement therein, and the slots are sufficiently deep so as to permit the vanes to fully retract therein. Also, six equally spaced vanes may be provided rather than the eight as shown without departing from the invention.

Figure 7:
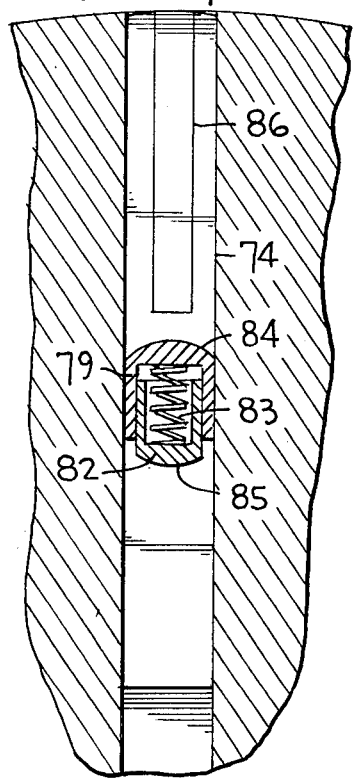
FIG. 7 is a sectional view taken substantially along line 7—7 of FIG. 6.

The stator includes opposite side walls 75 and 76 with eccentric grooves 77 and 78 formed in these side walls and opening inwardly toward the rotor. Each vane is provided with integral and transversely extending lugs 79 having bores 81 therein as typically shown in FIG. 6. Bearing pieces 82 are telescoped within the bores of these lugs and are urged outwardly thereof by means of coil springs 83 so as to urge the lugs and these cooperating pieces into constant bearing engagement with opposite side walls of the eccentric grooves. Also, as seen in FIG. 7, the bearing surfaces of the lugs and of the bearing pieces are rounded as at 84 and 85 so as to reduce friction when in engagement with the eccentric groove walls and, as further seen in FIG. 6, each of the vanes includes side segments 86 thereof near their tips thrust outwardly against the opposite side walls of the stator by means of coil springs 87. These floating dowels of each of the vanes permits a tight spring loaded fit against the stator side walls so as to function much as a piston ring of a conventional internal combustion engine.

The eccentric grooves are so disposed on the stator side walls as to permit full retraction of the vanes when positioned between the intake and the discharge openings as clearly shown in FIG. 2. And, the eccentric grooves permit gradual extension of the vanes out of their slots as they rotate away from the intake opening. Full extension of the vanes is effected for slightly bearing at their tips against inner surface 59 of the stator as the vanes move farther away from the intake opening.

An intake chamber is thereby defined adjacent the intake opening which is of greater volume than the chamber segments between the fully extended vanes as shown and, as the vanes approach discharge opening 69, the eccentric grooves are so disposed relative to the rotary vanes as to permit them to gradually retract so as to thereby define a discharge chamber at the discharge end. Accordingly, a pumping action is effected for this rotary vanes pump for the pumping of hydraulic fluid from the primary pump and into the driven pumps or motors at the vehicle wheels which are caused to rotate by the output taken off the output shafts of the driven pumps. And, it should be noted that all the inner surfaces of the stator are completely bathed in hydraulic fluid so as to avoid undue heat build-up from friction.

Figure 12:
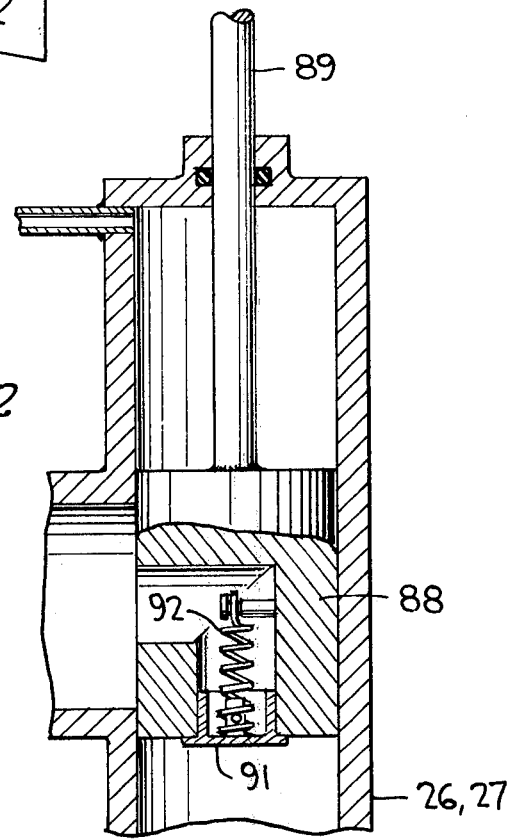
FIG. 12 is a sectional view of a service brake plug used in effecting braking of the vehicle.

Service brake means are easily provided for this system by simply interrupting fluid flow through the ducts to thereby interrupt rotation of the driven pump rotors. To this end, service brake plugs 88 are disposed in the supply and return ducts 26 and 27 as shown in FIG. 1. These plugs are conveniently disposed at locations in the ducts so as to permit the stems 89 thereof to be connected to the service brake operation means (not shown) for movement of these plugs upon brake pedal depression into the path of fluid movement through the ducts. As shown in detail in FIG. 12 each brake plunger 88 has a poppet valve 91 which opens against a spring 92. The valve thus opens with the directional flow of fluid to prevent cavitation during either forward or reverse vehicle motion. And, disc or drum type brakes may be added to the rear wheels for use as emergency brakes. Other features of a standard vehicle are likewise provided such as a speedometer cable, a parking pawl for the gear and a safety blow-off valve in the primary pump at the discharge end thereof. Also, the present vehicle is a true four wheel independent suspension system.

From the foregoing, it can be seen that a positive hydraulic drive has been devised for a vehicle with the use of a rotary vane pump that avoids the need for a cam groove against which the vanes tips constantly bear and are urged against by means of springs as in the prior art. Moreover, the primary drive pump and the driven pumps at each of the wheels are of the same design.

Obviously, many modifications and variations of the present invention are made possible in the light of the above teachings. It is therefore to be understood that within the scope of the appended claims the invention may be practiced otherwise than as specifically described.

What is claimed is:

1. A fluid rotary vanes pump, comprising: a stationary cylindrical stator; a cylindrical rotor co-axially mounted within said stator, vanes being mounted on said rotor for sliding movement within radially extended slots provided therein; intake and discharge openings communicating with the interior of said stator; blow-by prevention means on said stator lying between said openings extending toward and bearing against the outer surface of said rotor; an inner surface of said stator being spaced from said outer surface to define a fluid chamber; eccentric grooves disposed in opposing side walls of said stator, said vanes having lugs thereon extending into said grooves, said lugs each being formed of a fixed lug part and a telescoping movable lug part with means between said parts urging them outwardly of one another into intimate contact with opposing walls of said grooves, said vanes thereby cooperating with said grooves so as to be guided therealong for causing gradual vane movement from a fully retracted position between said openings to a fully extended position bearing against said inner surface as said vanes move away from said intake opening, and from said fully extended position back to said fully retracted position as said vanes move toward said discharge opening, whereby intake and discharge chambers are defined near said intake and discharge openings, respectively, facilitating a pumping action as said rotor rotates.

2. The pump according to claim 1, wherein said blow-by prevention means comprises at least one shoe member having an outer bearing surface contoured the same as said outer surface, and springs provided for urging said shoe member toward said outer surface.

3. The pump according to claim 1, wherein each of said vanes has movable portions urged toward said stator side walls by springs provided therebeneath, whereby said vanes make intimate contact with said stator side walls upon rotation thereof.

4. A vehicle having a power plant and a plurality of ground-engaging driving wheels, a hydraulic drive system, comprising: a positive displacement driving pump having a power input shaft drivingly connected to said power plant, a fluid intake opening and a fluid discharge opening; positive displacement driven pumps associated with each of said wheels and each having intake and discharge openings and a power output shaft drivingly connected to each said wheel for driving same; a fluid supply duct connecting said fluid discharge opening of said driving pump with said fluid intake openings of said driven pumps, and a fluid return duct means connecting said fluid discharge openings of said driven pumps with said fluid intake opening of said driving pump; said pumps each comprising a fluid rotary vanes pump including: a stationary cylindrical stator; a cylindrical rotor co-axially mounted within said stator and having an outer surface spaced inwardly of the inner surface of said stator; radially extending slots on said rotor and vanes mounted for sliding movement within said slots; blow-by prevention means disposed between said intake and discharge openings; eccentric grooves on said stator, said vanes having lugs thereon extending into said grooves, said lugs each including fixed and movable parts with means therebetween urging said parts into intimate contact with opposing side walls of said grooves, said vanes thereby cooperating with said grooves so as to be guided therealong for causing movement of said vanes from a fully retracted position between said openings to a fully extended position bearing against said inner surface as said vanes move away from said intake opening, and from said fully extended position back to said fully retracted position as said vanes move toward said discharge opening, whereby intake and discharge openings are defined near said intake and discharge openings, respectively, facilitating a pumping action as said rotor of each said pump rotates in a forward direction.

5. The vehicle according to claim 4, wherein a controllable by-pass valve is disposed near said driving pump and interconnects said first and second ducting means, said by-pass valve controlling the amount and pressure of fluid being shunted to said driven pumps to thereby control the acceleration and speed of the vehicle.

6. The vehicle according to claim 4, wherein a switchover valve device interconnects said fluid supply and return ducts, said device having a rotatable section including a pair of first conduits respectively aligned with said first and second ducting means in a first position of said section, and further including a pair of second conduits for cross-switching said supply and return ducts to thereby effect a return flow through said supply duct and supply flow through said return duct for causing a reverse rotary motion of said driving pump rotors.

7. The vehicle according to claim 4, wherein braking plungers are disposed in said fluid supply and fluid discharge ducts, said plungers being operatively connected to a service brake pedal provided for the vehicle for sliding movement into the flow path of said ducts to thereby prevent fluid flow therein and cause said driven pump rotors to halt rotation so as to effect a braking action.

* * * * *